United States Patent [19]

Beatty

[11] Patent Number: 5,473,497
[45] Date of Patent: Dec. 5, 1995

[54] ELECTRONIC MOTOR LOAD SENSING DEVICE

[75] Inventor: James A. Beatty, Fort Wayne, Ind.

[73] Assignee: Franklin Electric Co., Inc., Bluffton, Ind.

[21] Appl. No.: 14,327

[22] Filed: Feb. 5, 1993

[51] Int. Cl.⁶ ............................................. H02H 7/00
[52] U.S. Cl. ........................... 361/23; 361/28; 361/30; 361/79
[58] Field of Search ................... 361/23, 28, 29, 361/30, 31, 79, 90, 94, 33

[56] References Cited

U.S. PATENT DOCUMENTS

| | | | |
|---|---|---|---|
| 3,727,103 | 4/1973 | Finch et al. | 317/13 R |
| 3,814,986 | 6/1974 | Zanini | 317/13 R |
| 3,818,270 | 6/1974 | Hagiz | 361/23 |
| 3,958,164 | 5/1976 | Hess | 318/431 |
| 4,000,446 | 12/1976 | Vandevier et al. | 317/36 TD |
| 4,021,700 | 5/1977 | Ellis-Anwyl | 361/28 |
| 4,040,117 | 8/1977 | Houser | 361/33 |
| 4,123,792 | 10/1978 | Gephart et al. | 361/30 |
| 4,156,280 | 5/1979 | Griess | 364/481 |
| 4,306,265 | 12/1981 | Kuntner et al. | 361/31 |
| 4,345,288 | 8/1982 | Kampf et al. | 361/31 |
| 4,368,499 | 1/1983 | Stifter | 361/90 |
| 4,379,986 | 4/1983 | Baxter et al. | 318/434 |
| 4,419,625 | 12/1983 | Bejot et al. | 324/142 |
| 4,453,117 | 6/1984 | Elms et al. | 318/778 |
| 4,509,088 | 4/1985 | Profio | 361/29 |
| 4,541,029 | 9/1985 | Ohyama | 361/31 |
| 4,584,623 | 4/1986 | Bello et al. | 361/90 |
| 4,597,025 | 6/1986 | Rutchik et al. | 361/94 |
| 4,703,387 | 10/1987 | Miller | 361/79 |
| 4,796,142 | 1/1989 | Libert | 361/23 |
| 4,801,874 | 1/1989 | Loeffler | 324/142 |
| 4,812,729 | 3/1989 | Ito et al. | 318/732 |
| 4,841,404 | 6/1989 | Marshall et al. | 361/30 |
| 4,864,287 | 9/1989 | Kierstead | 340/648 |
| 4,875,000 | 10/1989 | Fry et al. | 318/798 |
| 4,901,181 | 2/1990 | Miyanaga et al. | 361/33 |
| 4,914,371 | 4/1990 | Shibata et al. | 318/723 |
| 4,945,298 | 7/1990 | Nakashima | 318/635 |
| 4,954,764 | 9/1990 | Kim | 318/798 |
| 4,965,504 | 10/1990 | Ueda et al. | 318/802 |
| 4,967,304 | 10/1990 | Dougherty | 361/31 |
| 4,980,791 | 12/1990 | Alberkrack et al. | 361/90 |
| 5,027,049 | 6/1991 | Pratt et al. | 318/807 |

Primary Examiner—Marc S. Hoff
Assistant Examiner—S. Jackson
Attorney, Agent, or Firm—Marshall, O'Toole, Gerstein, Murray & Borun

[57] ABSTRACT

A device for measuring energy delivered by a motor to a load is adapted to be connected to the motor which is coupled to the load and connected to a power source through first and second power supply lines. The device includes a line voltage sensing circuit for sensing the voltage across the power supply lines, a line current sensing circuit for sensing the current flowing through the motor and a pulse width modulator which modulates the sensed voltage to produce a pulse width modulated first electrical signal. The device also includes a first switch, responsive to the pulse width modulated first electrical signal which modulates an output of the line current sensing circuit to produce a power waveform and an integrator which integrates the power waveform to produce an output signal indicative of the energy delivered by the motor to the load. The device further includes a switch controller which compares the output signal to a first reference signal to detect the existence of an overload condition and which compares the output signal to a second reference signal to detect the existence of an underload condition. The switch controller opens a second switch to disconnect the motor from the power source in response to either an overload condition or an underload condition.

35 Claims, 12 Drawing Sheets

5,473,497

ELECTRONIC MOTOR LOAD SENSING DEVICE

TECHNICAL FIELD

The present invention relates generally to a control system for a power delivering apparatus and more particularly to an energy measuring device and a protection system incorporating the same for use in an electrical motor.

BACKGROUND ART

Electrical induction motors are used in many systems, such as pumps, which are subject to underloading and overloading conditions. A water pump, for example, may become underloaded when the level of water falls below the pump intake valve and may become overloaded when sand or other debris present within the water being pumped accumulates within the pumping mechanism. When either condition occurs, abnormally high currents can flow through the motor windings which can cause overheating and motor burn-out.

A variety of electrical controls have been devised in order to protect an electrical motor from damage caused by underload or overload conditions. It is known, for example, to detect an abnormal motor voltage or current as an indication of an overload or underload condition and to disconnect power from the motor in response thereto. Such a system is shown in Bello, et al., U.S. Pat. No. 4,584,623, wherein a circuit for protecting voltage sensitive motors, such as refrigerator compressors, detects an overvoltage or an undervoltage within the motor and disconnects the power source from the motor in response thereto. Likewise, Fry, et al., U.S. Pat. No. 4,875,000 discloses a circuit for detecting an overcurrent in a phase winding of a three phase motor and a mechanism, responsive to the detection circuit, for stopping the flow of current through the phase winding when an overcurrent occurs.

It is also known to detect an overload or an underload condition by sensing the power factor of the motor. For example, Miller, U.S. Pat. No. 4,703,387 discloses a circuit which measures the power factor of a motor by detecting a phase difference between a motor line voltage and a motor line current and a mechanism which disconnects the motor from a power supply when the power factor is outside a predetermined range. Gephart, et al., U.S. Pat. No. 4,123,792, discloses a system which multiplies a motor current by a power factor signal to produce a signal indicative of the instantaneous motor operating loads. This signal is then rectified, averaged and compared to a set of reference levels to detect an overload or an underload condition.

All of these systems are considered inadequate, however, because they rely on motor voltage, current or power factor measurements which are not as accurate an indication of the power delivered to the load as are motor input power measurements. Methods based on voltage or current measurements are also prone to inaccuracies caused by line or input voltage amplitude fluctuations.

Bejot, et al., U.S. Pat. No. 4,419,625 discloses a device for use in a three phase motor which integrates the product of a phase current signal, developed from one of the motor phase lines, with a line-to-line voltage signal, developed from the other two motor phase lines, to produce a power signal which represents the mean power absorbed by the motor. Signals representing motor losses are then subtracted from the power signal to produce an estimate of the power delivered to the load. This system, however, is complex and is susceptible to line voltage amplitude fluctuations which can cause inaccurate power readings.

It is a general object of the present invention to provide an improved motor protection system which utilizes simple and inexpensive components to sense motor input power and to detect motor overload and underload conditions. It is also a general object of the present invention to provide a unique motor energy measuring device which is more immune to line voltage amplitude fluctuations than known devices.

SUMMARY OF THE INVENTION

The present invention provides a measuring device adapted for use in an electrical motor which produces an indication of the energy delivered by the motor to a load. The present invention also provides a motor protection device which is more immune to input voltage amplitude variations than prior art devices. More particularly, a device for measuring energy delivered by a motor to a load is adapted to be connected to the motor which is coupled to the load and is connected to a power source through first and second power supply lines and includes means for developing first and second electrical signals indicative of first and second parameters of power delivered to the load. The device also includes pulse width modulating means for pulse width modulating the first electrical signal to produce a pulse width modulated first electrical signal, modulating means, responsive to the pulse width modulated first electrical signal, for modulating the second electrical signal to produce a power waveform and means responsive to the power waveform for producing an output signal indicative of the energy delivered by the motor to the load.

The device may include controlling means, responsive to the output signal, for controlling the power delivered to the motor. More particularly, the controlling means may include first detecting means for detecting an overload condition or an underload condition and means responsive to the first detecting means and coupled to one of the power supply lines for disconnecting the motor from the power source when an overload condition or an underload condition is detected.

The first electrical signal may have a plurality of positive half-cycles and negative half-cycles while the producing means may include integrating means for integrating the power waveform wherein the integrating means includes second detecting means for detecting the plurality of positive half-cycles or negative half-cycles and an integrator for integrating the power waveform during the plurality of positive half-cycles or negative half-cycles to produce the output signal. The integrating means may also include means for combining output signals developed during consecutive positive half-cycles or negative half-cycles and means for resetting the integrator after a predetermined number of cycles of the first electrical signal.

The modulating means may include a switch which alternately connects the second electrical signal to the integrating means and disconnects the second electrical signal from integrating means in response to the pulse width modulated first electrical signal. Further, the developing means may include a voltage sensor and a current sensor for producing the first electrical signal and the second electrical signal, respectively. Phase shifting means may also be included for phase shifting the second electrical signal. Preferably, the phase shifting means shifts the second electrical signal between zero and ten electrical degrees.

According to a further aspect of the invention, a protection system adapted to be connected to an electric motor and first and second power supply lines which are connected to an AC power source which supplies a line voltage and a line current, includes a line voltage sensing means, adapted to be connected to the power supply lines, for sensing the voltage therebetween to produce a voltage signal and a line current sensing means, adapted to be connected to one of the power supply lines, for sensing the current flowing therethrough to produce a current signal. The protection system also includes pulse width modulating means for pulse width modulating one of the voltage or current signals to produce a pulse width modulated signal and a modulating means, preferably comprising a switch, responsive to the pulse width modulated signal, for modulating the other of the voltage or current signals to produce a modulated waveform. The protection system further includes means for integrating the modulated waveform to produce an energy signal, means responsive to the energy signal for detecting the existence of an overload or an underload condition and means for disconnecting the AC power source from the electric motor in response to an overload or an underload condition.

According to a still further aspect of the invention, a method for controlling a motor connected to a load, wherein the motor is also connected to a power source through first and second power supply lines, includes the steps of developing first and second electrical signals indicative of first and second parameters of power delivered to the motor and pulse width modulating the first electrical signal to produce a pulse width modulated first electrical signal. The method also includes the steps of modulating the second electrical signal in accordance with the pulse width modulated first electrical signal to produce a power waveform and producing an output signal from the power waveform wherein the output signal is indicative of the energy delivered by the motor to the load.

DESCRIPTION OF THE PREFERRED EMBODIMENTS

Figure 1:
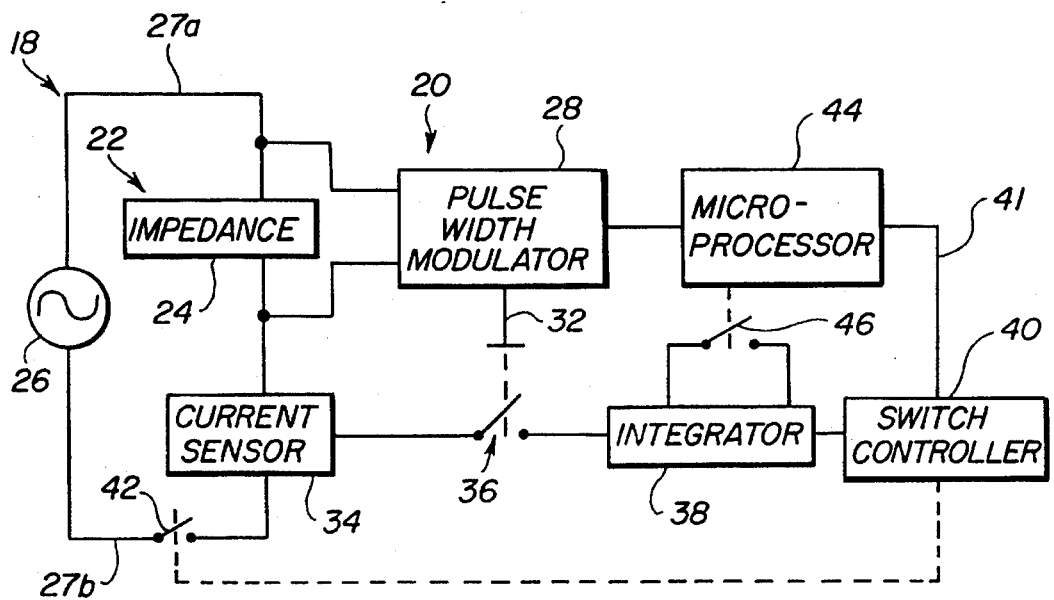
FIG. 1 comprises a block diagram of a motor system including an energy measuring device according to the present invention.

Referring now to FIG. 1, a motor system 18 includes an energy measuring device 20, capable of detecting motor overload and underload conditions, and a motor 22 which, when coupled to a load (not shown), has an impedance 24. The motor 22 is energized by a power source 26 which supplies AC line voltage and line current to the motor 22 via power supply lines 27a and 27b. The measuring device 20 develops first and second electrical signals indicative of first and second parameters of power delivered to the load, pulse width modulates the first electrical signal to produce a pulse width modulated first electrical signal, and modulates the second electrical signal in accordance with the pulse width modulated first electrical signal to produce a power waveform. The measuring device 20 then integrates the power waveform to produce an output signal indicative of the energy delivered by the motor 22 to the load.

More particularly, a pulse width modulator (PWM) 28 senses the line voltage appearing across the impedance 24 and produces a voltage signal which is a pulse width modulated version of the line voltage. This pulse width modulated voltage signal is developed at a PWM output 32. The AC line voltage is modulated by the PWM 28 during each of either the positive half-cycles or negative half-cycles of the line voltage so that the pulse width modulated voltage signal comprises a set of pulses at times corresponding to each of either the positive half-cycles or negative half-cycles and a value of zero at times corresponding to the other of the positive half-cycles or negative half-cycles.

A current sensor 34 detects the line current which flows through the motor 22 and delivers a current signal indicative thereof to a switch 36. The switch 36 modulates the current signal and is controlled in accordance with the pulse width modulated voltage signal produced by the PWM 28 at the PWM output 32 such that the switch 36 is closed during each pulse of the pulse width modulated voltage signal and is open at all other times. In this manner, the switch 36 effectively multiplies the voltage appearing across the motor impedance 24 with the current flowing through the motor 22 during every other half-cycle of the line voltage to produce a modulated current signal indicative of the real power delivered by the power source 26 to the motor 22.

An integrator 38 integrates the modulated current signal developed by the switch 36 to produce an energy waveform which is indicative of the energy delivered to the motor 22 during each positive half-cycle or negative half-cycle of the line voltage and, therefore, which is indicative of the energy delivered by the motor 22 to the load. The energy waveform developed by the integrator 38 is delivered to a switch controller 40 which latches the final value of the energy waveform in response to a signal developed, for example, on a line 41 and compares the latched value with a set of predetermined levels to detect a motor overload or underload condition. If the amplitude of the energy waveform is above a first predetermined level an overload condition is detected and the switch controller 40 opens a normally closed switch 42 to disconnect the power source 26 from the motor 22. Likewise, if the amplitude of the energy waveform is below a second predetermined level, an underload condition is detected and the switch controller 40 opens the switch 42 to disconnect the power source 26 from the motor 22. In this manner the motor system 18 is protected during overload and underload conditions.

The integrator 38 is reset by a microprocessor 44 in conjunction with a switch 46. The microprocessor 44 counts the cycles of the line voltage appearing across the impedance and produces a reset signal after a predetermined number of line cycles. The reset signal closes the switch 46 in order to reset the integrator 38 and thereby to reset the energy waveform to a value of zero. The microprocessor 44 can reset the integrator 38 every half-cycle so that the integrator 38 produces an energy waveform indicative of the energy delivered to the motor 22 during any particular line voltage half-cycle or, alternatively, the microprocessor 44 can reset the integrator 38 after a predetermined number of line cycles. This latter configuration enables the integrator 38 to integrate the modulated current signal produced by the switch 36 over a number of consecutive line cycles which, in turn, enables the measuring device 20 to measure comparatively small amounts of energy over a number of line cycles to produce an accurate indication of the motor loading condition. The microprocessor 44 produces a latching signal on the line 41 prior to resetting the switch 46. The latching signal enables the switch controller 40 to latch the energy waveform produced by the integrator 38.

Alternatively, the operation of the switch controller 40 can be performed by the microprocessor 44. In such a configuration, the output of the integrator 38 is converted into a digital signal by an A/D converter (not shown). The digital signal is provided to the microprocessor 44 which determines whether an overload or an underload condition exists in the manner described hereinbefore with respect to the switch controller 40. In this configuration, the microprocessor 44 directly controls the switch 42 in order to disconnect power from the motor 22 when an underload or an overload condition occurs.

It should also be noted that the measuring device 20 can alternatively be configured such that the PWM 28 pulse width modulates the current signal produced by the current sensor 34 to produce a pulse width modulated current signal. In this configuration, the pulse width modulated current signal controls the operation of the switch 36 which modulates the line voltage to produce a modulated voltage signal, which is then integrated by the integrator 38 to produce the energy waveform.

Figure 2:
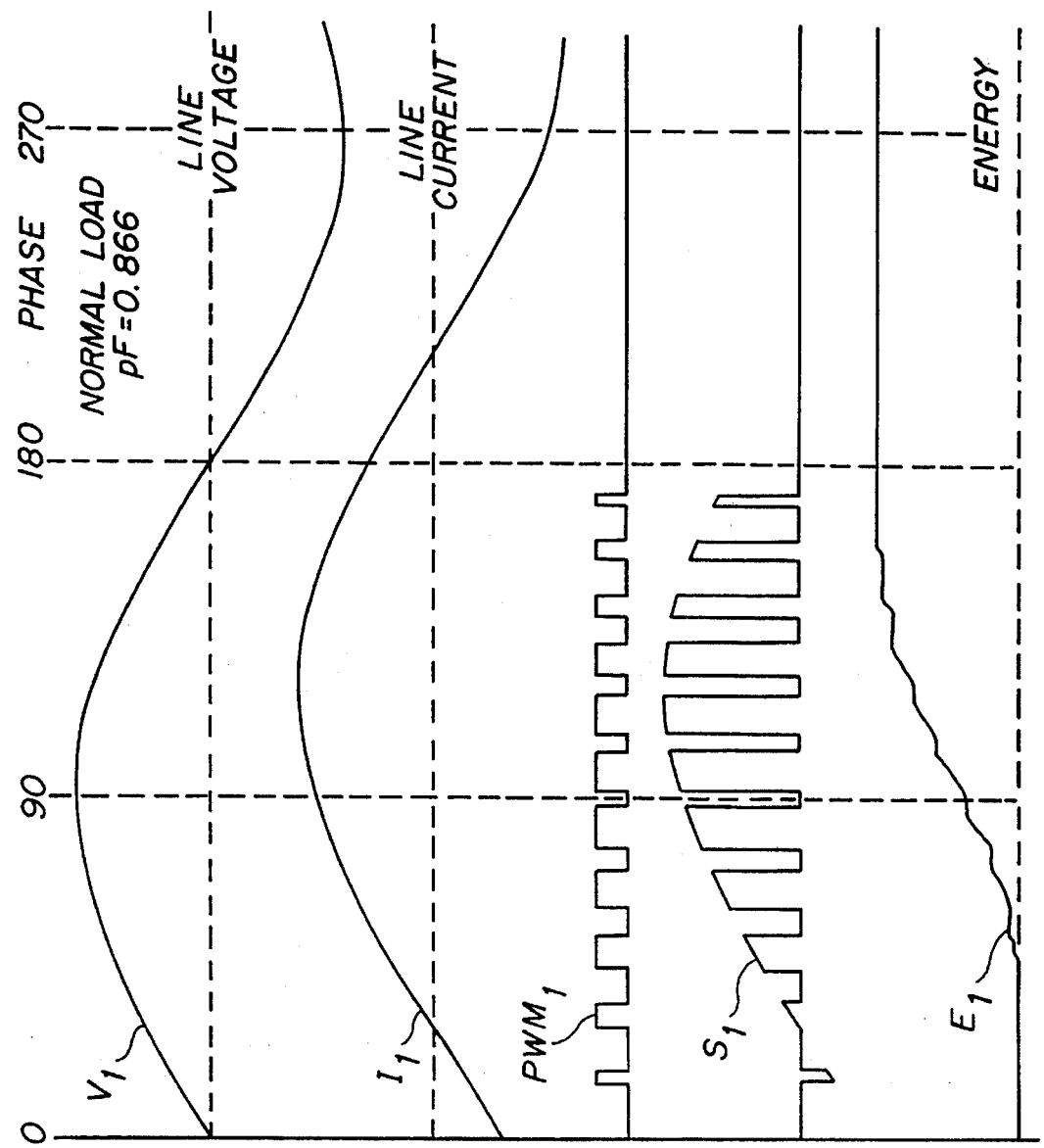
FIG. 2 comprises a series of waveform diagrams illustrating the operation of the energy measuring device of FIG. 1 when the motor is operating in a normal load condition.

FIG. 2 illustrates signals generated within the motor system 18 when the motor 22 is operating in a normal load condition (i.e., when the motor 22 is operating with a power factor of 0.866). A voltage signal $V_1$ represents the line voltage delivered across the motor impedance 24, a current signal $I_1$ represents the line current flowing through the motor 22 as detected by the current sensor 34 and a signal $PWM_1$ represents the modulated voltage signal produced by the PWM 28. As indicated in FIG. 2, the signal $PWM_1$ is a pulsed signal having positive pulses during the positive half-cycles of the voltage signal $V_1$ wherein the width of the pulses are determined in accordance with the amplitude of the voltage signal $V_1$. A signal $S_1$ represents the output of the switch 36 and is produced by modulating the current signal $I_1$ with the signal $PWM_1$. An energy waveform $E_1$ represents the output of the integrator 38 which integrates the signal $S_1$ during a single positive half-cycle of the voltage signal $V_1$.

Figure 3:
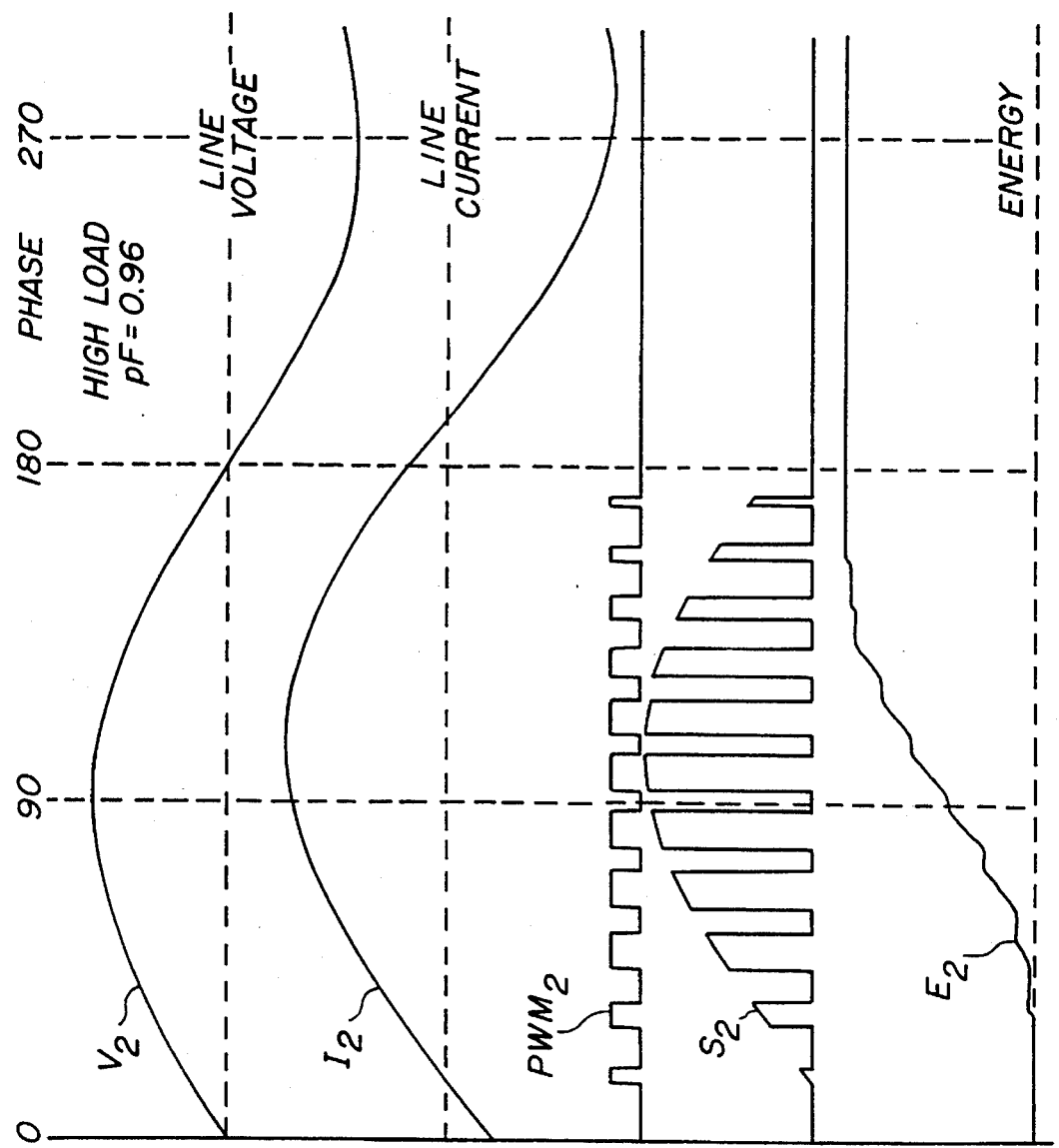
FIG. 3 comprises a series of waveform diagrams illustrating the operation of the energy measuring device of FIG. 1 when the motor is operating in a high load condition.

FIG. 3 illustrates a voltage signal $V_2$, a current signal $I_2$, a signal $PWM_2$ produced by the PWM 28, a signal $S_2$ produced by the switch 36 and an energy waveform $E_2$ produced by the integrator 38 when the motor 22 is operating in a high load condition (i.e., when the motor 22 is operating with a power factor of 0.96) As indicated in FIG. 3, the energy waveform $E_2$ produced by the integrator 38 when the motor 22 is operating in a high load condition reaches a higher level after a single positive half-cycle of the voltage signal $V_2$ than that of the energy waveform $E_1$ produced by the integrator 38 when the motor 22 is operating in a normal load condition. As such, the energy waveform produced by the integrator 38 is indicative of the amount of energy delivered by the motor 22 to the load.

Figure 4:
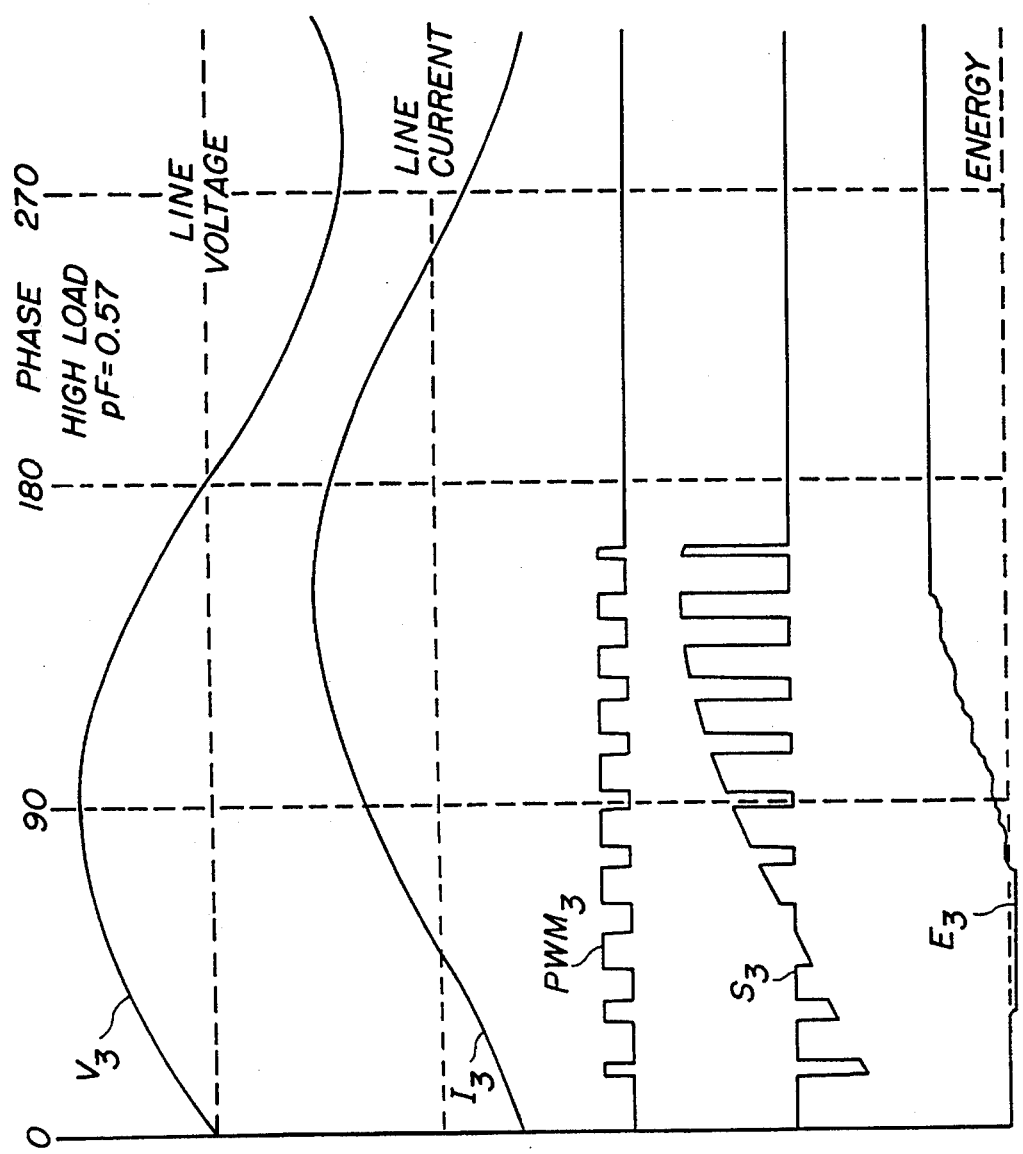
FIG. 4 comprises a series of waveform diagrams illustrating the operation of the energy measuring device of FIG. 1 when the motor is operating in a light load condition.

FIG. 4 illustrates a voltage signal $V_3$, a current signal $I_3$, a signal $PWM_3$ produced by the PWM 28, a signal $S_3$ produced by the switch 36 and an energy waveform $E_3$ produced by the integrator 38 when the motor 22 is operating in a light load condition (i.e., when the motor 22 is operating with a power factor of 0.57). As can be seen, the final level of the energy waveform $E_3$ produced by the integrator 38 after a single positive half-cycle of the voltage signal $V_3$ in a light load condition is lower than the level of the energy waveform $E_1$ developed when the motor 22 is operating in a normal load condition. As is evident from the FIGS. 2–4, the level of the energy waveform developed by the integrator 38 after a single half-cycle of the line voltage acts as an indication of the motor loading condition. Thus, the medium, high and low levels attained by the energy waveforms $E_1$, $E_2$, and $E_3$ after a single half-cycle of the line voltage indicate normal, high, and light motor load conditions, respectively.

Figure 5:
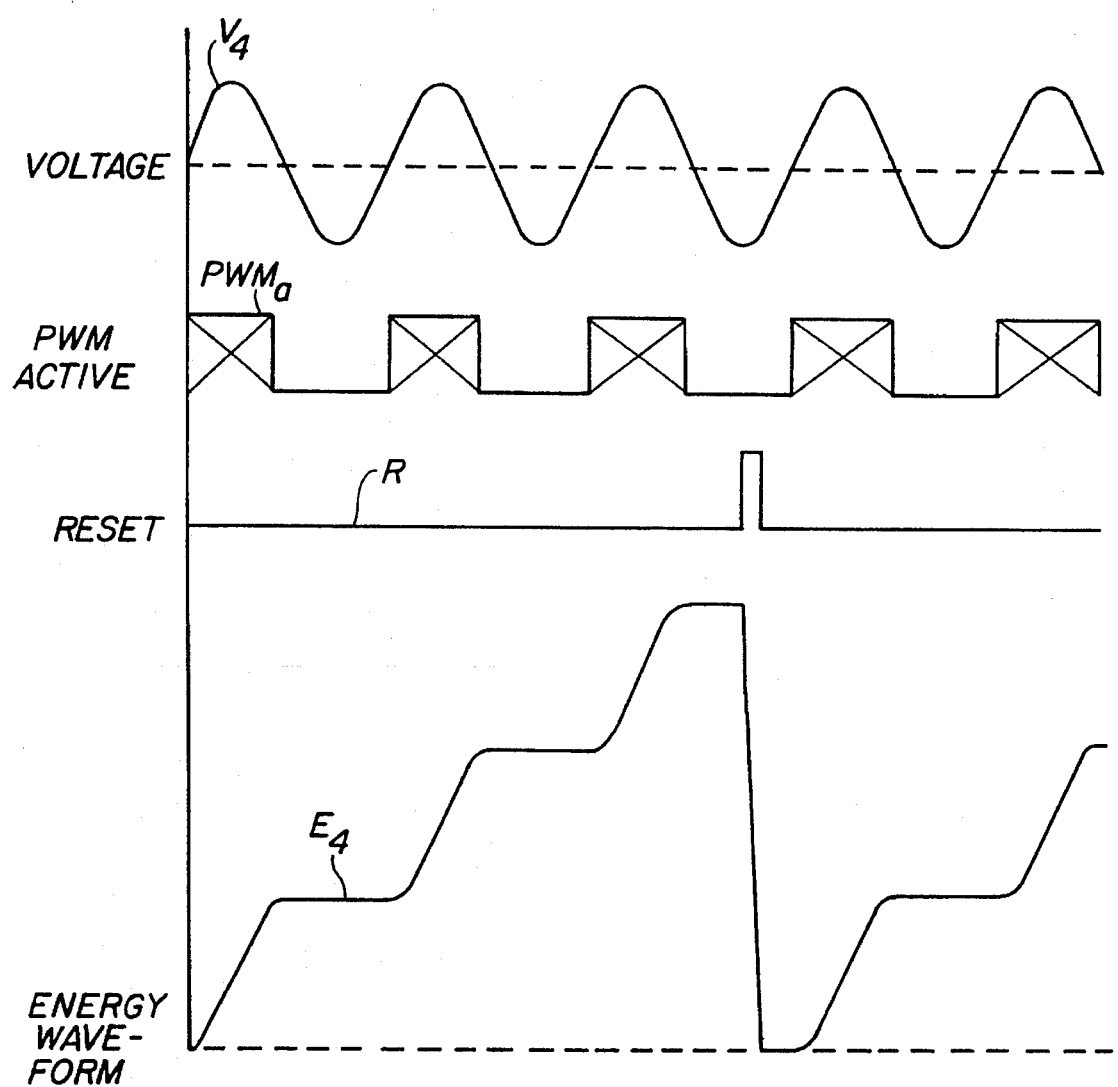
FIG. 5 comprises a series of waveform diagrams illustrating the operation of the energy measuring device of FIG. 1.

FIG. 5 illustrates the effect of integrating the modulated current signal over three cycles of the line voltage. A voltage signal $V_4$ illustrates the line voltage, a signal $PWM_a$ represents the line voltage half-cycles during which the PWM 28 is active, a signal R represents the reset signal produced by the microprocessor 44 to control the switch 46 and an energy waveform $E_4$ represents the output of the integrator 38 during the operation of the measuring device 20. As shown in FIG. 5, the energy waveform $E_4$ rises during each of the positive half-cycles of the voltage signal $V_4$, remains constant during each of the negative half-cycles of the voltage signal $V_4$ and increases over the full cycles of the voltage signal $V_4$ until the reset signal R is produced by the microprocessor 44. At this time, the integrator 38 is reset and the energy waveform $E_4$ returns to a value of zero.

Figure 6:
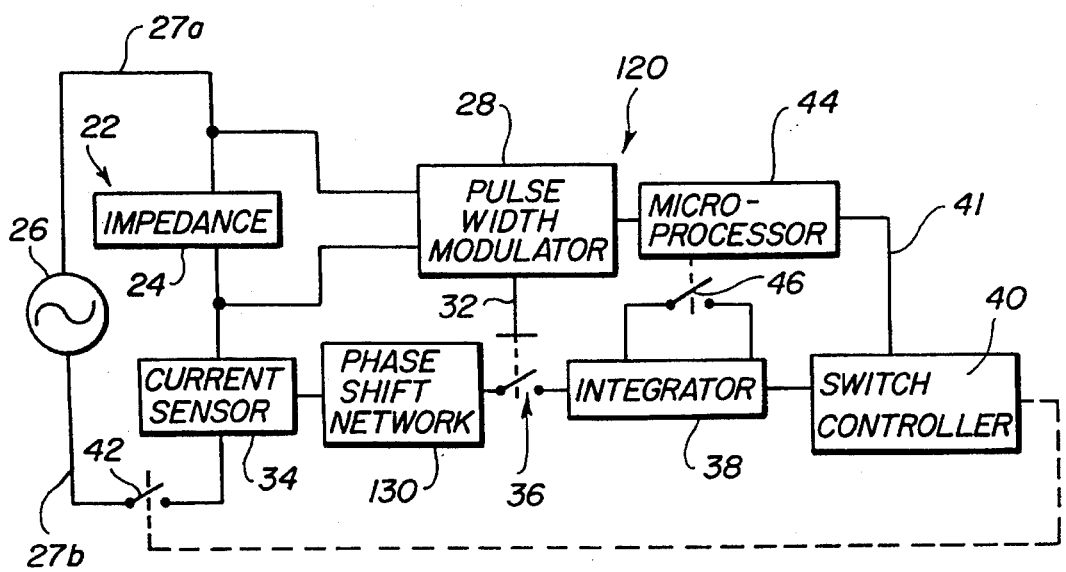
FIG. 6 comprises a block diagram of a motor system with an energy measuring device including a phase shift network according to the present invention.

Referring now to FIG. 6, a measuring device 120 having a degree of immunity to line voltage amplitude fluctuations is shown. The measuring device 120 is similar to the measuring device 20 shown in FIG. 1 with like components being numbered identically to the corresponding components shown in FIG. 1. The measuring device 120 operates in the same manner as that described with respect to the measuring device 20 of FIG. 1 except that a phase shift network 130 is connected between the current sensor 34 and the switch 36. The phase shift network 130 adds a predetermined phase delay to the current signal produced by the current sensor 34 before the current signal is modulated by the switch 36. This added phase delay compensates for variations in the amplitude of the line voltage appearing on the lines 27a and 27b and, therefore, enables the integrator 38 to produce an energy waveform which is more indicative of motor torque than of motor input power. As such, the measuring device 120 of FIG. 6 produces a more accurate measurement of motor load than does the measuring device 20 of FIG. 1.

The effect of the phase shift network 130 will be described in conjunction with FIGS. 2 and 7–10. FIG. 2 illustrates the line voltage signal $V_1$, the line current signal $I_1$, the switch output signal $S_1$, and the energy waveform $E_1$ for the measuring device 120 when the motor 22 is operating in a normal load and a normal line voltage amplitude condition (i.e., the line voltage signal $V_1$ has an amplitude of 230 volts) and when the phase shift network 130 adds zero degrees of phase shift to the output of the current sensor 34.

Figure 7:
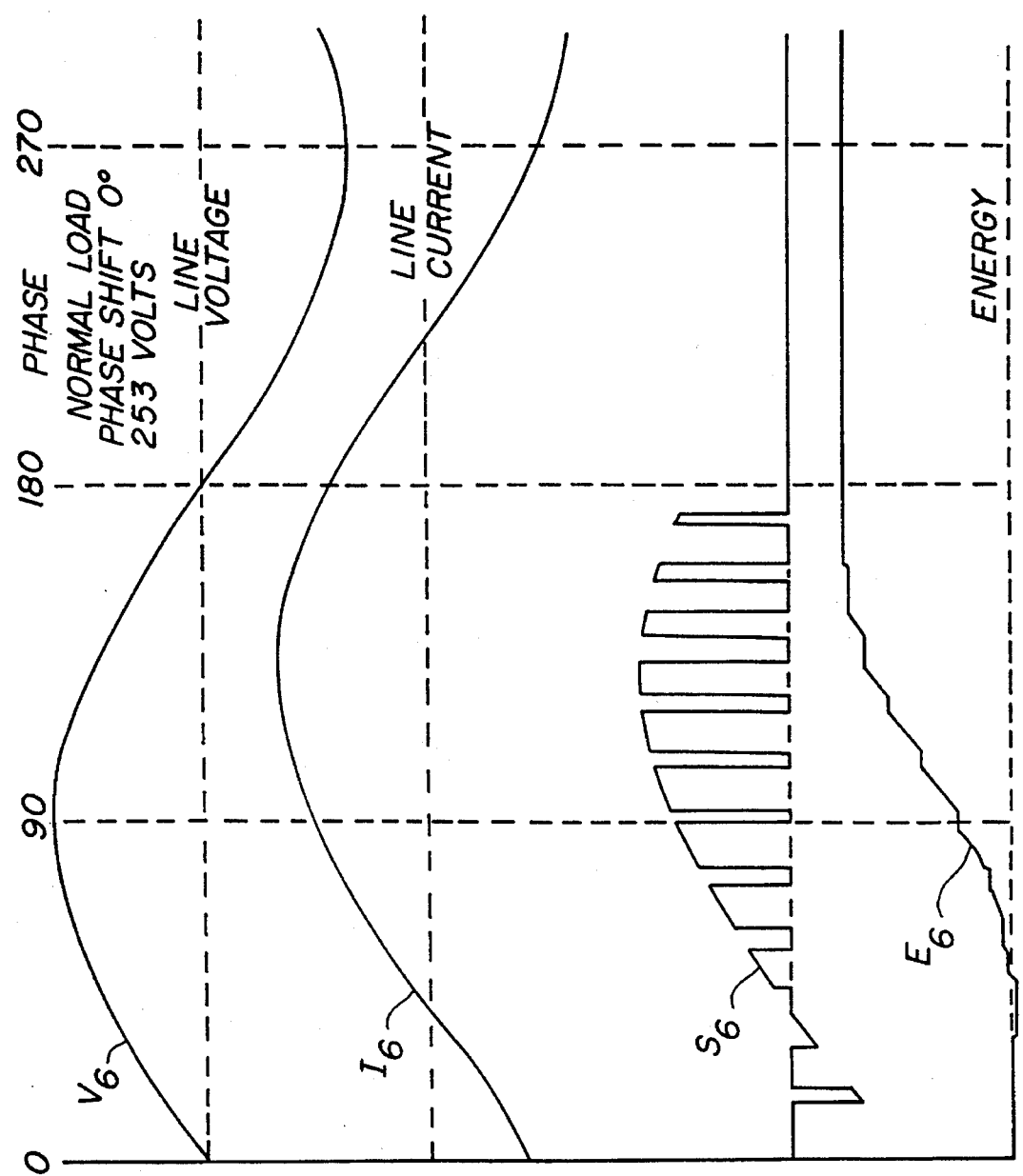
FIG. 7 comprises a series of waveform diagrams illustrating the operation of the energy measuring device of FIG. 6 when the motor is operating in a normal load, high line voltage amplitude condition and when zero degrees of phase shift are added by the phase shift network of FIG. 6.

FIG. 7 illustrates a line voltage signal $V_6$, a line current signal $I_6$, a switch output signal $S_6$ and an energy waveform $E_6$ for the measuring device 120 when the motor 22 is operating in a normal load and a high line voltage amplitude condition (i.e., the line voltage signal $V_6$ has an amplitude of 253 volts) and when the phase shift network 130 adds zero degrees of phase shift to the output of the current sensor 34. As indicated in FIG. 7, an abnormally high line voltage amplitude causes the integrator 38 to produce the energy waveform $E_6$ which reaches a higher level after each half-cycle of the line voltage signal $V_6$ than the energy waveform $E_1$ developed when the motor 22 is operating under the normal line voltage amplitude condition illustrated in FIG. 2. This phenomena can result in a false overload detection which can be very troubling in sensitive motor applications. It should be noted that a low line voltage amplitude condition causes the integrator 38 to produce an energy waveform which reaches a lower than normal level which, in turn, can result in a false underload detection by the measuring device 120.

Figure 8:
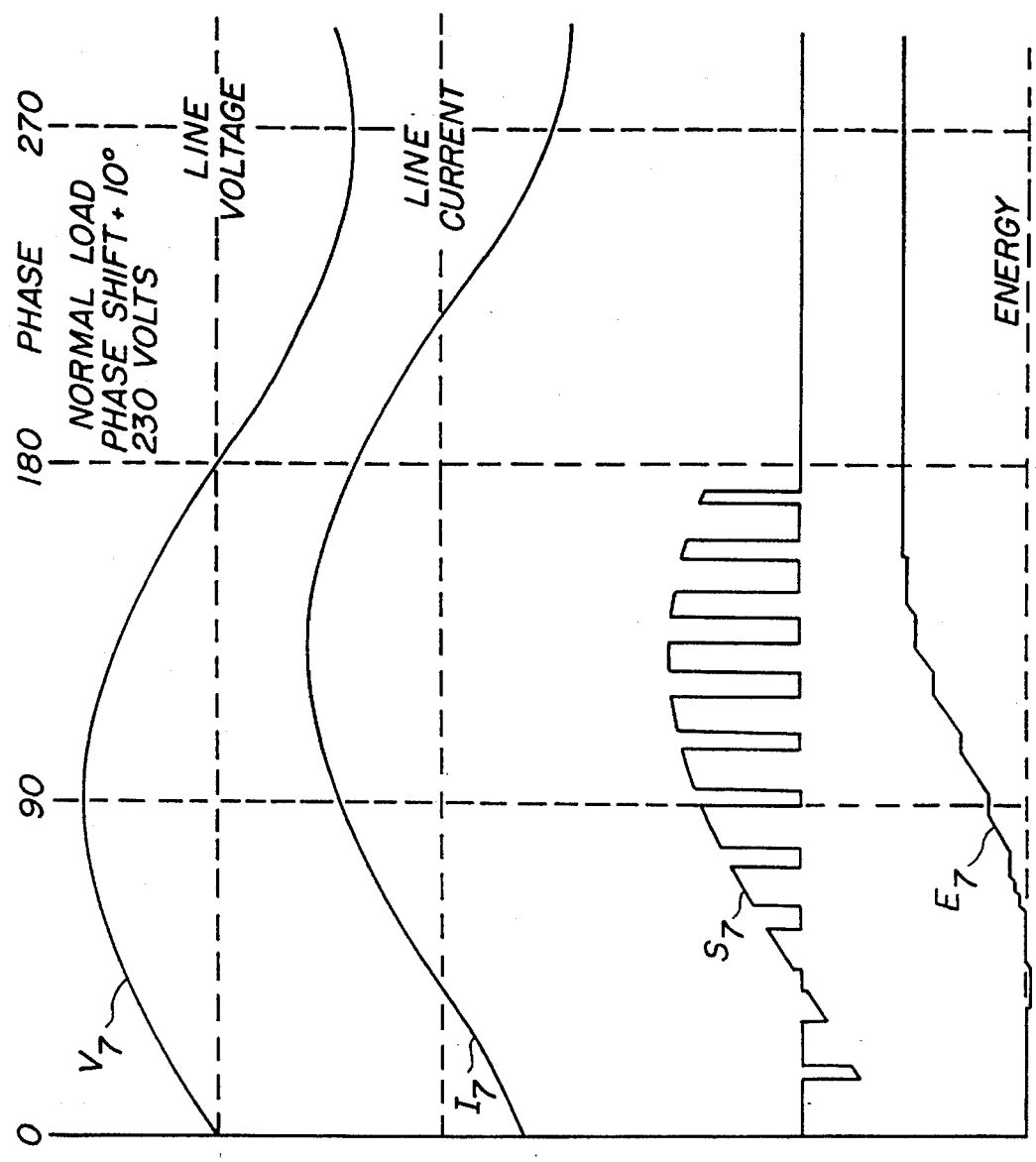
FIG. 8 comprises a series of waveform diagrams illustrating the operation of the energy measuring device of FIG. 6 when the motor is operating in a normal load, normal line voltage amplitude condition and when ten degrees of phase shift are added by the phase shift network of FIG. 6.
Figure 9:
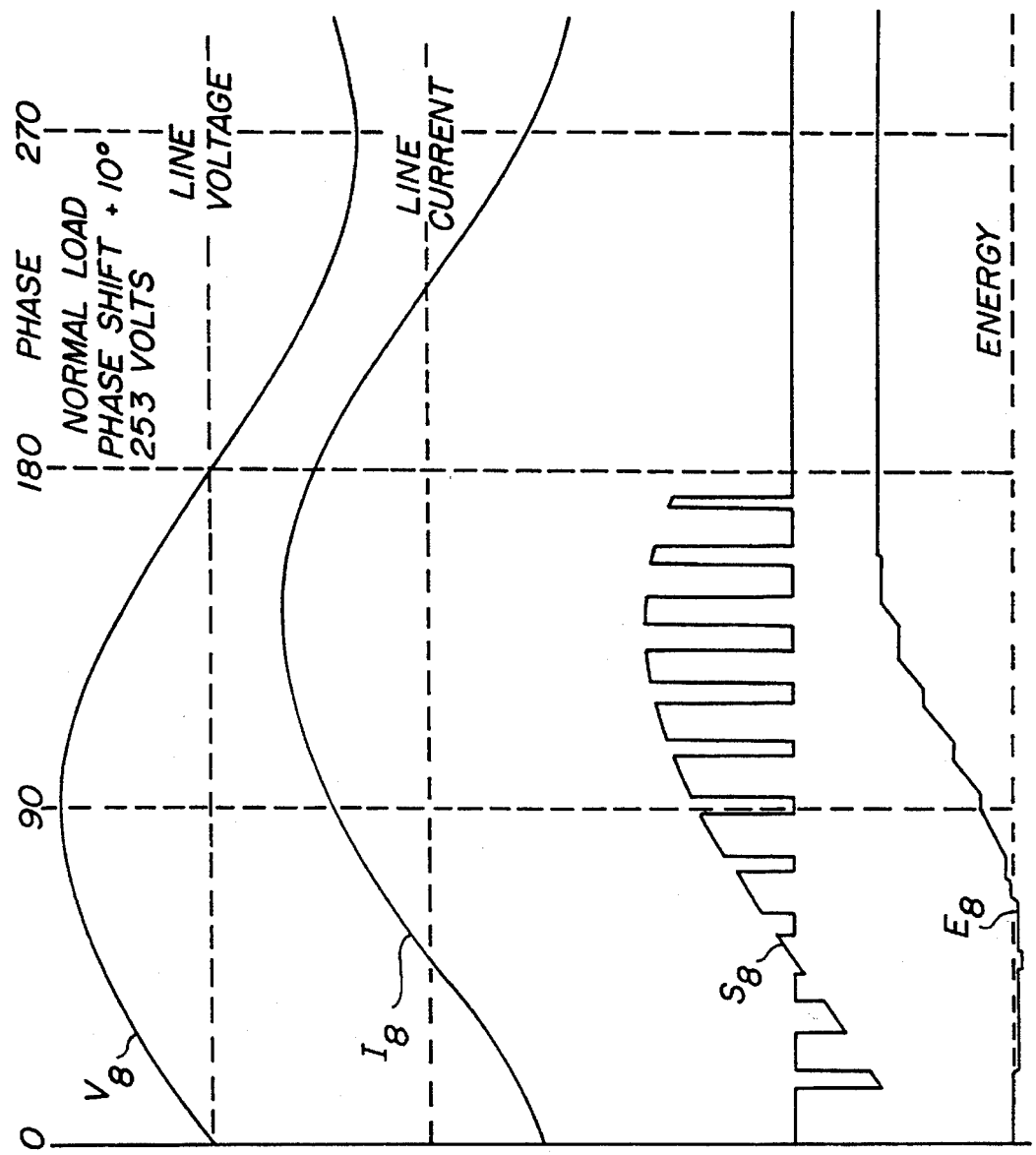
FIG. 9 comprises a series of waveform diagrams illustrating the operation of the energy measuring device of FIG. 6 when the motor is operating in a normal load, high line voltage amplitude condition and when ten degrees of phase shift added by the phase shift network of FIG. 6.

The waveforms shown in FIGS. 8 and 9 illustrate the operation of the measuring device 120 when the motor 22 is operating under the same conditions described with respect to the FIGS. 2 and 7, respectively, but wherein the phase shift network 130 adds a phase shift of ten degrees to the output of the current sensor 34. Thus, FIG. 8 illustrates a line voltage signal $V_7$, a line current signal $I_7$, a switch output signal $S_7$ and an energy waveform $E_7$ produced by the integrator 38 when the motor 22 is operating in a normal load, and a normal line voltage amplitude condition. As indicated in FIG. 8, the energy waveform $E_7$, reaches a level approximately equal to the final level of the energy waveform $E_1$ of FIG. 2 produced by the integrator 38 when the motor 22 is operating in a normal load and a normal line voltage amplitude condition, but when the phase shift network 130 adds zero degrees of phase shift to the output of the current sensor 34.

FIG. 9 illustrates a line voltage signal $V_8$, a line current signal $I_8$, a switch output signal $S_8$ and an energy waveform $E_8$ produced when the motor 22 is operating in a normal load and a high line voltage amplitude condition, but when the phase shift network 130 adds a phase shift of ten degrees to the current signal produced by the current sensor 34. As indicated in FIG. 9, the energy waveform $E_8$ produced by the integrator 38 reaches a level that is only slightly higher then the energy waveform $E_7$ of FIG. 8. This comparison indicates that the phase shift network 130 compensates for line voltage amplitude fluctuations by reducing the error developed in the level of the energy waveform solely as a result of higher or lower line voltage amplitudes. This compensation can further be seen by comparing the difference in the levels developed by the energy waveform $E_6$ of FIG. 7 and the energy waveform $E_1$ of FIG. 2 (which difference represents the error produced by line voltage amplitude fluctuations without the phase shift network 130 present) with the difference in the levels developed in the energy waveform $E_8$ of FIG. 9 and the energy waveform $E_7$ of FIG. 8 (which difference represents the error produced by line voltage amplitude fluctuations with the phase shift network 130 present).

Thus, by adding a predetermined phase shift to the current signal produced by current sensor 34, the phase shift network 130 provides the measuring device 120 shown in FIG. 6 with a higher degree of immunity from errors caused by line voltage amplitude fluctuations than does the measuring device 20 shown in FIG. 1. As such, the measuring device 120 is less likely to detect a false overload or underload condition resulting from line voltage amplitude fluctuations than is the measuring device 20.

Figure 10:
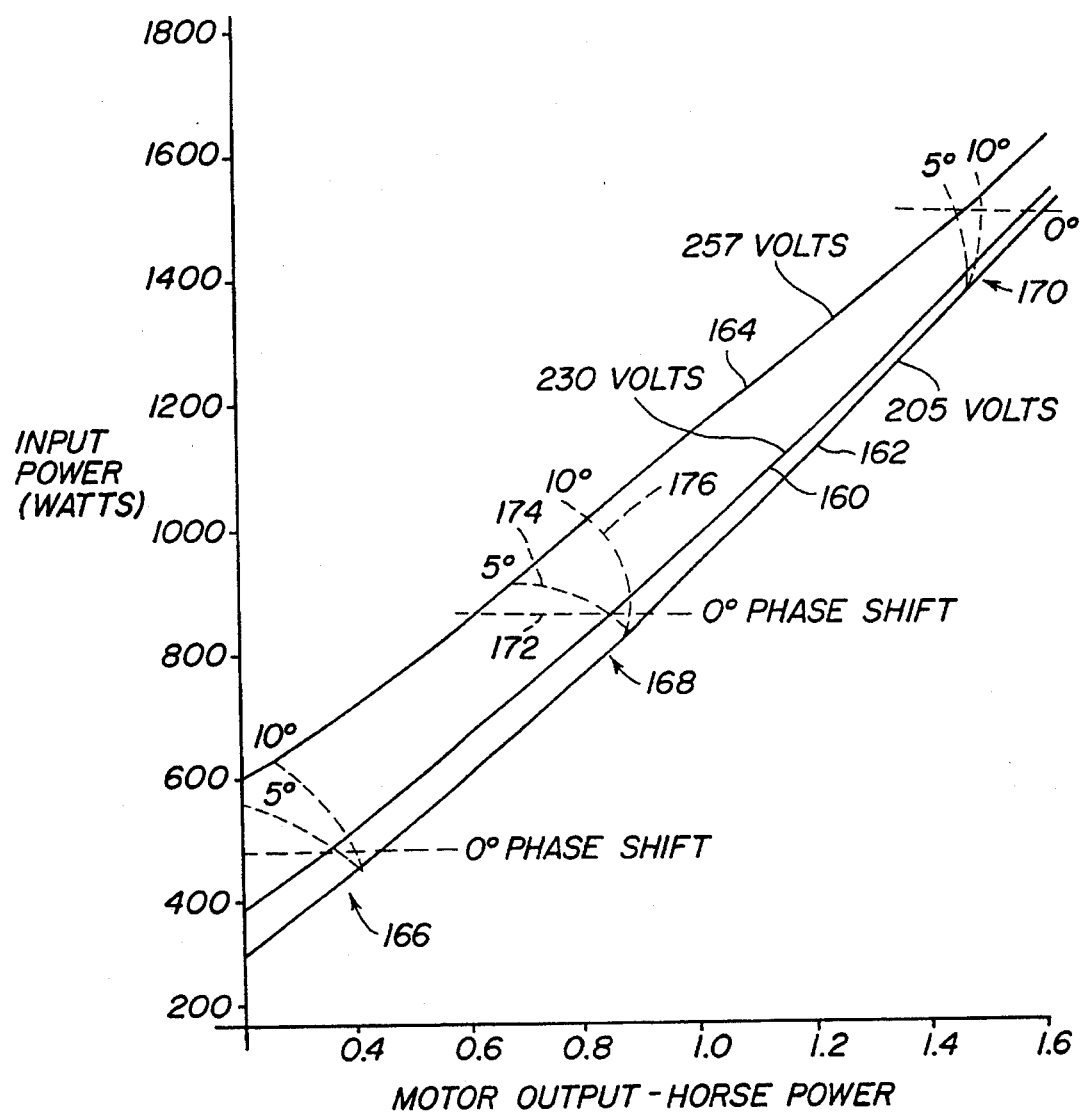
FIG. 10 comprises a graph illustrating the effects of the phase shift network of FIG. 6 over a range of constant motor line voltage amplitudes.

FIG. 10 illustrates the operation of the measuring device 120 over a range of line voltage amplitudes. The graph shown in FIG. 10 plots input power delivered to the motor 22 versus output power delivered to the load for constant line voltage amplitudes of 230 volts (line 160), 205 volts (line 162) and 257 volts (line 164). The effects of the phase shift network 130 are shown by three sets of dashed lines. The first set, shown generally at a location 166, illustrates the operation of the phase shift network 130 during a light motor load condition. The second set, shown generally at a location 168, illustrates the operation of the phase shift network 130 during a normal motor load condition, and the third set, shown generally at a location 170, illustrates the operation of the phase shift network 130 during a heavy motor load condition.

The dashed lines marked 0°, 5° and 10° at each of the locations 166, 168 and 170 indicate the motor 22 operating points for a constant output from the integrator 38 with the phase shift network 130 adding a phase lag of 0°, 5°, and 10° to the current signal developed by the current sensor 34. Thus, when the motor 22 operates under a normal load and when the phase shift network 130 adds zero degrees of phase shift to the current signal, as indicated by a dashed line 172, the motor input power must remain constant as the line voltage amplitude increases or decreases in order for the energy waveform produced by the integrator 38 to remain at a constant level. This situation does not occur in actual practice, however, because an increase in the line voltage amplitude usually increases the power delivered to the motor 22 while a decrease in the line voltage amplitude usually decreases the power delivered to the motor 22. Thus, as noted before, without the phase shift network 130, the energy waveform produced by the integrator 38 is more a measure of motor input energy than of motor output energy.

Lines 174 and 176 illustrate the motor 22 operating points for constant output power from the measuring device 120 when the phase shift network 130 adds 5° and 10°, respectively, to the current signal produced by the current sensor 34. Note that as positive degrees of phase shift are added, the motor operating points for constant output from the integrator 38 become more horizontal, which indicates that the motor input power can increase or decrease as the line voltage amplitude increases or decreases, without a significant effect on the energy waveform produced by the integrator 38. The lines 172, 174, and 176 illustrate that as the phase detector 130 increases the amount of phase lag added to the output of the current sensor 34, the measuring device 120 tends to measure motor torque or motor output energy, which is not effected by line voltage amplitudes fluctuations, instead of measuring motor input energy, which is effected by line voltage amplitude fluctuations. Similar results can be seen during the light and heavy motor load conditions shown generally at 166 and 170, respectively.

As indicated in FIG. 10, as the phase shift increases up to approximately 10° (where, at least in a high motor load condition, the motor operating points for a constant output from the integrator 38 approximate a horizontal line) the measuring device 120 becomes more immune to shifts in line voltage amplitude and thus produces a more reliable determination of motor overload or underload conditions. Although the phase shift is typically chosen to be within the range of zero and ten degrees, it should be noted that more than ten degrees of phase shift can be added. The exact amount of added phase shift is dependent upon the specific motor configuration and upon the desired motor load operating point. Although the phase shift network 130 does not compensate exactly for any amount of line voltage amplitude fluctuation, it does allow a more precise measurement of the motor output power than that achieved by the measuring device 20 shown in FIG. 1. The phase shift network 130 also makes the measuring device 120 more immune to line voltage amplitude variations than other prior art devices.

Figure 11A:
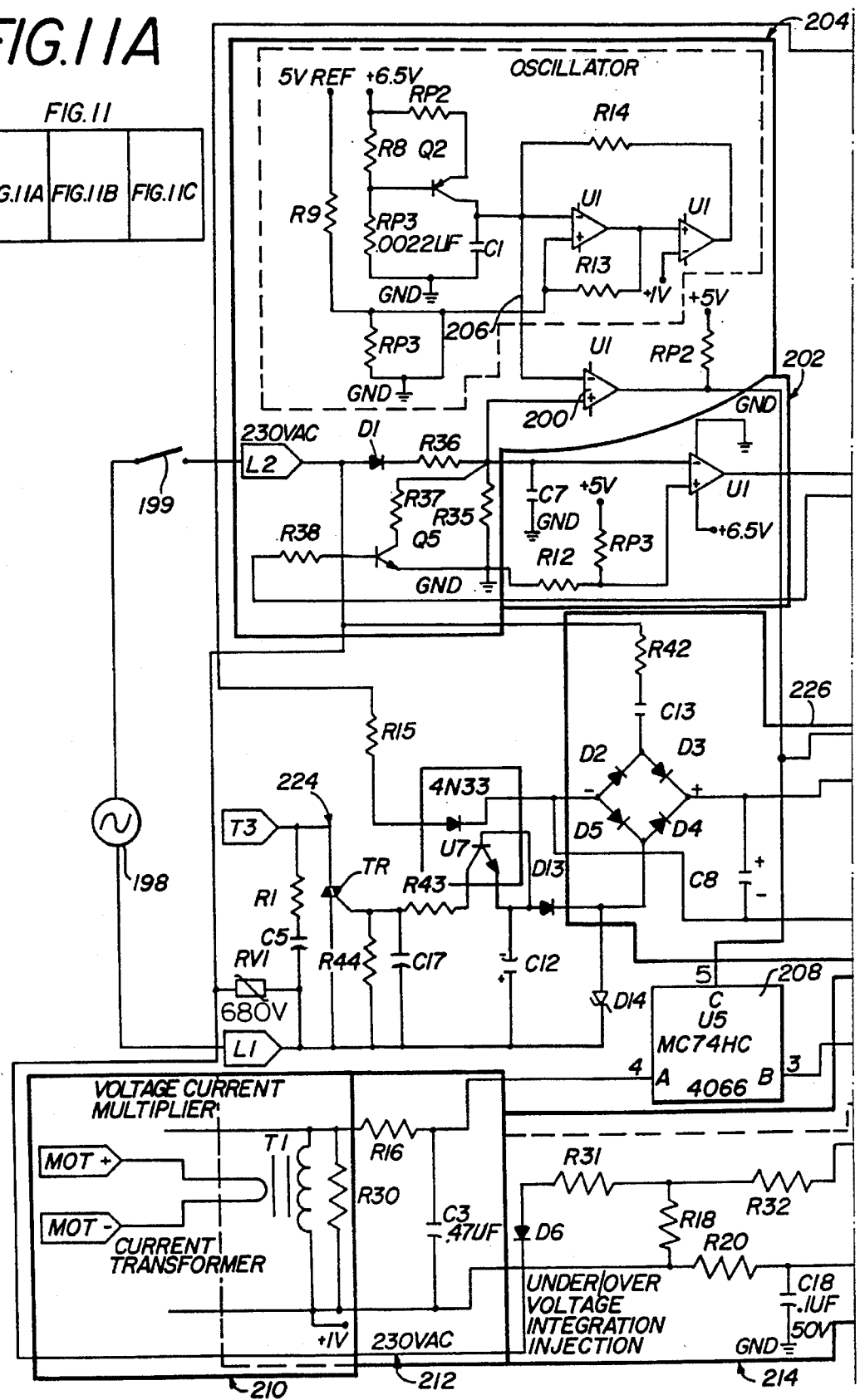
FIGS. 11a–11c comprise a circuit schematic diagram of one embodiment of the motor system according to the present invention.
Figure 11B:
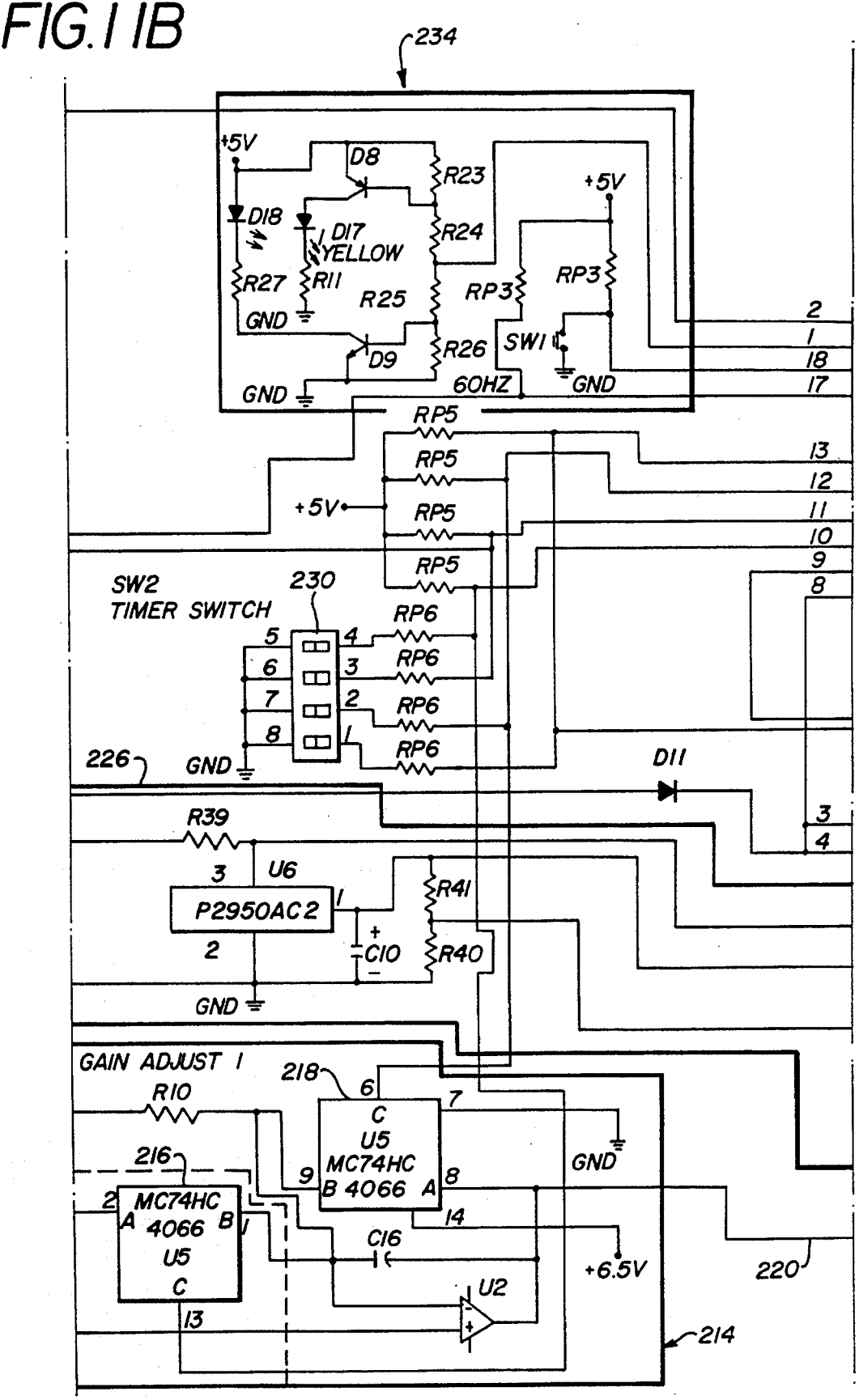
Figure 11C:
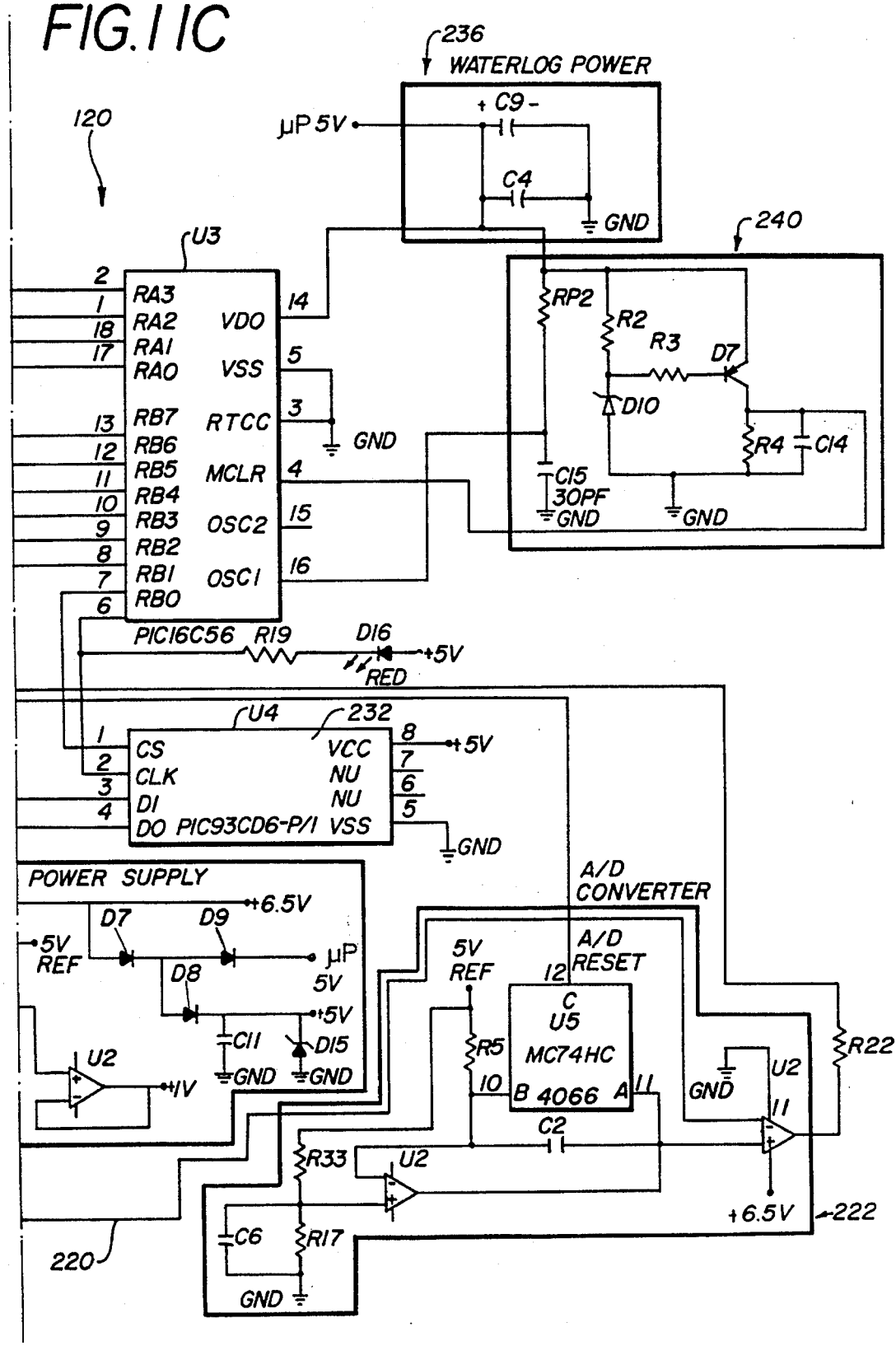

FIGS. 11a–11c comprise a circuit schematic diagram of one embodiment of the energy measuring device 120 according to the present invention. While some of the individual circuit component types are indicated in FIGS. 11a–11c it should be noted that other types of components can be chosen according to commonly known techniques.

Referring to FIG. 11a, input terminals L1 and L2 are connected to an AC power source 198, typically comprising a 230 volt, 60 hertz AC power source, and receive an AC input voltage. The energy measuring device 120 may be connected to the AC power source through a pressure switch 199 which connects and disconnects the energy measuring device 120 to the power source 198 in response to, for example, the water level of a tank. A diode D1 rectifies the input voltage appearing at the terminal L2 and provides a half-wave rectified voltage to an input of a comparator 200 and to a timing circuit 202. The timing circuit 202 produces a timing signal which indicates which half-cycle (i.e., positive or negative half-cycle) of the input voltage is currently appearing at the terminal L2. The timing signal, which comprises a 60 hertz pulse signal, is delivered to an input pin 17 of a microprocessor U3, comprising a Microchip PIC16C56 microprocessor integrated circuit.

An oscillator circuit 204 (FIG. 11c) produces a ramping voltage on a line 206 which is delivered to a second input of the comparator 200. The comparator 200 compares the ramping voltage with the half-wave rectified voltage to produce the pulse width modulated voltage signal. The comparator 200 and the oscillator circuit 204 operate as a pulse width modulator.

The output of the comparator 200 is delivered to a switch circuit 208, comprising a 4066 chip, and controls the switching operation thereof. A primary winding of a toroidal transformer T1 is connected to one of the motor windings (not shown) via terminals Mot⁺ and Mot⁻ and is thereby responsive to the current flowing through the motor. The secondary winding of the transformer T1 develops a voltage across a resistor R30, which is indicative of the line current and, therefore, comprises a current signal. A resistor R16 and a capacitor C3 are connected to the resistor R30, as shown in FIG. 11a, and operate as a phase shift network which phase delays the voltage across the resistor R30 by a predetermined amount. In this manner, a phase delayed current signal is provided to an input of the switch 208. The switch 208 modulates the phase delayed current signal in response to the pulse width modulated voltage signal developed by the comparator 200 and provides a modulated voltage signal, indicative of the motor power, to an integrator circuit 214 (FIGS. 11a and 11b). As illustrated in FIG. 11b, the integrator circuit 214 integrates the modulated voltage signal to produce an energy waveform at a line 220. A switch 218, which is controlled by the microprocessor U3, operates to reset the output of the integrator circuit 214. The microprocessor U3 (FIG. 11c) is responsive to the pulse width modulated voltage signal developed by the comparator 200, which is delivered through a diode D11 to an input pin 8, and to the timing signal at the pin 17 and closes the switch 218 so as to reset the integrator 214 in a proper manner.

Referring now to FIG. 11c, the energy waveform produced by the integrator circuit 214 is delivered across the line 220 to an A/D converter 222 which converts the energy waveform into a digital signal which, in turn, is delivered to an input pin 9 of the microprocessor U3. The microprocessor U3 is responsive to the 60 hertz pulse signal at pin 17 and to the digital signal at pin 9 and develops an indication of the energy being delivered to the motor load in a manner described hereinbefore. As noted earlier, this motor load indication is used to determine whether the motor is operating in an overload or an underload condition. The microprocessor U3 further controls the operation of a switch control circuit 224 (FIG. 11a) having a triac TR which, via a terminal T3, causes a contactor, via a terminal T3, to disconnect power from the motor when an underload or an overload condition is detected by the microprocessor U3.

A power supply circuit 226 (FIGS. 11a–11c), which is connected between the line voltage input terminals L1 and L2, rectifies and filters the AC input voltage to provide DC power to the active circuit components shown in FIGS. 11a–11c. An operator programmable timer switch 230 (FIG. 11b) is connected to the microprocessor U3 and enables a user to select the length of time that the microprocessor U3 turns the motor off when an underload detection occurs.

Referring again to FIG. 11c, a memory circuit 232, comprising an EEROM, permanently stores calibration information. The memory circuit 232 enables the microprocessor U3, which periodically turns off, e.g., when power is removed from the microprocessor U3 by, for example, the pressure switch 199, to retrieve critical calibration information without the need for reprogramming or recalibrating the motor. An indicator circuit 234 (FIG. 11b) includes light emitting diodes D17 and D18 along with a resistor R19 and a light emitting diode D16 (FIG. 11c) and operates to indicate the status of the motor.

A waterlog power circuit 236 is connected to an input pin 14 of the microprocessor U3 and provides the microprocessor U3 with power when the AC line voltage has been removed from the microprocessor U3. This circuit allows the microprocessor U3 to operate in a sleep mode after removal of the power. In the sleep mode, the microprocessor U3 waits for a predetermined period of time, for example, 20 seconds, and then determines whether the power has been restored. If the power has not been restored, the microprocessor U3 shuts down. If the power has been restored, however, the microprocessor U3 returns to an active mode and begins to measure the energy being absorbed by the motor load. The microprocessor U3 also remembers that a power shutdown has occurred. If the power is removed again, the microprocessor U3, in conjunction with the waterlog power circuit 236, repeats the cycle. If, however, the input power is removed and restored a predetermined number of times during a short period of time (e.g., four times within one minute) which indicates a fault in the motor pump mechanism, the microprocessor. U3 disconnects the power from the motor. At this time the microprocessor U3 shuts down and prevents further operation until the motor is manually restarted, for example, by servicing thereof. In this manner, the microprocessor U3 in conjunction with the waterlog power circuit 236 prevents rapid cycling of the motor. A brown-out protection circuit 240 prevents the microprocessor U3 from operating when a low line voltage (i.e., lower than a predetermined level) is present at the terminals L1 and L2. This circuit thereby prevents damage to the energy measuring device during a low amplitude line voltage condition.

As noted above, other circuit components and/or systems can be used in addition to or in replacement of the circuit components shown in FIGS. 11a–11c. Further, the indicator circuit 234, the timer switch 230, the memory circuit 232 and the brown-out protection circuit 240 as shown in FIGS. 11b and 11c, are not absolutely necessary to the operation of this embodiment of the invention.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

I claim:

1. A device adapted to be connected to a motor which is coupled to a load for measuring energy delivered by the motor to the load, wherein the motor is adapted to be connected between first and second power supply lines connected to a power source, the device comprising:

developing means for developing first and second electrical signals indicative of first and second parameters of power delivered to the load;

pulse width modulating means for pulse width modulating the first electrical signal to produce a pulse width modulated first electrical signal;

modulating means responsive to the pulse width modulated first electrical signal for modulating the second electrical signal to produce a power waveform; and producing means responsive to the power waveform for producing an output signal indicative of the energy delivered by the motor to the load.

2. The device of claim 1, further comprising controlling means responsive to the output signal for controlling the power delivered to the motor.

3. The device of claim 2, wherein the controlling means includes first detecting means for detecting an overload condition or an underload condition and means responsive to the first detecting means and coupled to one of the lines for disconnecting the motor from the power source when an overload condition or an underload condition is detected.

4. The device of claim 3, wherein the producing means includes integrating means for integrating the power waveform.

5. The device of claim 4, wherein the first electrical signal has a plurality of positive half-cycles and negative half-cycles and wherein the integrating means includes second detecting means for detecting the plurality of positive half-cycles or negative half-cycles and an integrator for integrating the power waveform during the plurality of positive half-cycles or negative half-cycles.

6. The device of claim 5, wherein the integrating means includes means for combining the integrated power waveforms during consecutive positive half-cycles or negative half-cycles.

7. The device of claim 5, wherein the modulating means includes a switch which alternatively connects the second electrical signal to the integrating means and disconnects the second electrical signal from the integrating means in response to the pulse width modulated first electrical signal.

8. The device of claim 7, wherein the developing means includes a voltage sensor and a current sensor, and wherein the first electrical signal comprises a voltage signal and the second electrical signal comprises a current signal.

9. The device of claim 8, wherein the integrating means includes means for resetting the output signal after a predetermined number of cycles of the first electrical signal.

10. The device of claim 2, further including a phase shifting means connected between the developing means and the modulating means for phase shifting one of the first or the second electrical signals.

11. The device of claim 10, wherein the phase shifting means delays the one of the first or the second electrical signals in phase up to approximately ten electrical degrees.

12. The device of claim 10, wherein the phase shifting means delays the one of the first or the second electrical signals in phase approximately ten electrical degrees.

13. A protection system adapted to be connected to an electric motor and first and second power supply lines, the lines being connectable to an AC power source which supplies a line voltage and a line current, the system comprising:

line voltage sensing means adapted to be connected to the lines for sensing the voltage therebetween to produce a voltage signal;

line current sensing means adapted to be connected to one of the power supply lines for sensing the current flowing therein to produce a current signal;

pulse width modulating means for pulse width modulating one of the voltage or the current signals to produce a pulse width modulated signal;

modulating means responsive to the pulse width modulated signal for modulating the other of the voltage or current signals to produce a modulated waveform;

integrating means for integrating the modulated waveform to produce an energy signal;

detecting means responsive to the energy signal for detecting the existence of an overload or an underload condition; and disconnecting means responsive to the detecting means for disconnecting the AC power source from the electric motor in response to an overload condition or an underload condition.

14. The protection system of claim 13, further comprising phase shifting means for shifting the phase of one of the current signal or the voltage signal.

15. The protection system of claim 14, wherein the phase shifting means shifts the phase of the one of the current signal or the voltage signal approximately ten electrical degrees.

16. The protection system of claim 14, wherein the phase shifting means shifts the phase of the one of the current signal or the voltage signal up to approximately ten electrical degrees.

17. The protection system of claim 13, wherein the detecting means compares the energy signal to first reference signal and to a second reference signal to determine the existence of an overload condition or an underload condition, respectively.

18. The protection system of claim 17, wherein the voltage signal has positive half-cycles and negative half-cycles and wherein the integrating means includes further means for integrating the modulated current signal during a plurality of consecutive positive half-cycles or negative half-cycles.

19. The protection system of claim 17, wherein the voltage signal has positive half-cycles and negative half-cycles and wherein the integrating means includes further means for integrating the modulated current signal during at least one of the positive half-cycles or negative half-cycles.

20. The protection system of claim 19, wherein the disconnecting means includes a switch which is coupled to one of the power supply lines and is capable of interrupting the supply of power from the power source.

21. A method for controlling a motor connected to a load, wherein the motor is also connected to a power source through first and second power supply lines, the method comprising the steps of:

developing first and second electrical signals indicative of first and second parameters of power delivered to the motor;

pulse width modulating the first electrical signal to produce a pulse width modulated first electrical signal;

modulating the second electrical signal in response to the pulse width modulated first electrical signal to produce a power waveform; and producing an output signal from the power waveform wherein the output signal is indicative of the energy delivered by the motor to the load.

22. The method of claim 21, further including the step of controlling the power delivered to the motor in response to the output signal.

23. The method of claim 22, wherein the step of controlling includes the steps of detecting an overload condition or an underload condition and disconnecting the power source from the motor when an overload condition or an underload condition occurs.

24. The method of claim 23, wherein the step of developing includes the steps of sensing the voltage developed across the motor and sensing the current flowing through the motor, and wherein the first electrical signal comprises a voltage signal and the second electrical signal comprises a current signal.

25. The method of claim 21, further including the step of phase shifting one of the first or the second electrical signals prior to the step of modulating.

26. The method of claim 25, wherein the step of phase shifting the one of the first or the second electrical signals prior to the step of modulating comprises the step of phase shifting the one of the first or the second electrical signals up to approximately ten electrical degrees.

27. The method of claim 25, wherein the step of phase shifting the one of the first or the second electrical signals prior to the step of modulating comprises the step of phase shifting the one of the first or the second electrical signals approximately ten electrical degrees.

28. A method for controlling a motor connected to a load, wherein the motor is also connected to a power source through first and second power supply lines, the method comprising the steps of:

developing first and second electrical signals indicative of first and second parameters of power delivered to the motor;

pulse width modulating the first electrical signal to produce a pulse width modulated first electrical signal;

modulating the second electrical signal in response to the pulse width modulated first electrical signal to produce a power waveform; and producing an output signal from the power waveform wherein the output signal is indicative of the energy delivered by the motor to the load; and further including the steps of providing power for a short duration of time when a switch interrupts power flow through one of the power supply lines, producing a further signal indicative of the number of times within a predetermined amount of time that the switch has consecutively interrupted and re-enabled the flow of power through the power supply lines within the short duration of time and controlling the power delivered to the motor in response to the further signal to prevent rapid cycling of the motor.

29. A device adapted to be connected to a motor which is coupled to a load for measuring energy delivered by the motor to the load and further adapted to be connected to a switch which alternatively disconnects the device from and reconnects the device to a power source, wherein the motor is adapted to be connected between first and second power supply lines connected to the power source, the device comprising:

developing means for developing first and second electrical signals indicative of first and second parameters of power delivered to the load;

pulse width modulating means for pulse width modulating the first electrical signal to produce a pulse width modulated first electrical signal;

modulating means responsive to the pulse width modulated first electrical signal for modulating the second electrical signal to produce a power waveform;

producing means responsive to the power waveform for producing an output signal indicative of the energy delivered by the motor to the load;

controlling means responsive to the output signal for controlling the power delivered to the motor; and means for preventing rapid cycling of the motor including means for providing power for a short duration of time when the switch disconnects the device from the power source and means for indicating the number of times within a predetermined amount of time that the switch has disconnected the device from and reconnected the device to the power source within the short duration of time; wherein the controlling means is further responsive to the indicating means to disconnect the power source from the motor when the power source has been disconnected from and reconnected to the device a present number of times during the predetermined amount of time.

30. The device of claim 29, wherein the indicating means includes a memory which stores an indication of the number of times the switch has disconnected the device from and reconnected the device to the power source in the predetermined amount of time and wherein the providing means includes a capacitor which stores energy when the power source is connected to the device and which delivers energy to the indicating means for the short duration of time when the power source is disconnected from the device.

31. A motor protection device adapted to be connected between a motor and a switch which disconnects a power source from the motor protection device in response to a first condition and which reconnects the power source to the motor protection device in response to a second condition, wherein the motor protection device is adapted to prevent rapid cycling of the motor, the motor protection device comprising;

means for providing power for a short duration of time when the power source is disconnected from the motor protection device;

means for storing a signal indicative of the number of times within a predetermined amount of time that the power source is both disconnected from the motor protection device and reconnected to the motor protection device within an amount of time equal to the short duration of time; and means response to the signal for disconnecting the motor from the power source when the power source has been disconnected from and reconnected to the motor protection device a preset number of times during the predetermined amount of time.

32. The improvement of claim 31 wherein the storing means includes a memory and wherein the providing means includes a capacitor which stores energy when the power source is connected to the motor protection device and which delivers energy to the storing means for the short duration of time when the power source is disconnected from the motor protection device.

33. A device for measuring the torque delivered by a motor to a load, comprising:

first measuring means for measuring a first parameter of power across the motor to develop a first signal;

second measuring means for measuring a second parameter of power across the motor to develop a second signal;

a pulse width modulator responsive to the first signal for producing a pulse width modulated signal;

a modulator responsive to the second signal and to the pulse width modulated signal for modulating the second signal; and a phase shifter connected between either the first measuring means and the pulse width modulator or the second measuring means and the modulator for phase shifting one of the first or second signals.

34. The torque measuring device of claim 33, wherein the phase shifter phase shifts one of the first and the second signals up to approximately ten electrical degrees.

35. The torque measuring device of claim 33, wherein the phase shifter phase shifts one of the first and the second signals approximately ten electrical degrees.

* * * * *

UNITED STATES PATENT AND TRADEMARK OFFICE
CERTIFICATE OF CORRECTION

PATENT NO.    :   5,473,497
DATED         :   December 5, 1995
INVENTOR(S)   :   JAMES A. BEATTY It is certified that error appears in the above-identified patent and that said Letters Patent is hereby corrected as shown below:

Column 9, line 45, "circuit." should be --circuit (FIG 11c).--.

Column 10, line 29, "contactor, via a terminal T3, to" should be --contactor to--.

Signed and Sealed this

Nineteenth Day of November, 1996

Attest:

BRUCE LEHMAN

*Attesting Officer*          *Commissioner of Patents and Trademarks*